(12) United States Patent
Goettsche

(10) Patent No.: US 9,556,854 B2
(45) Date of Patent: Jan. 31, 2017

(54) MOBILE ROTARY DRIVE FOR A ROTOR OF A WIND POWER PLANT

(75) Inventor: Christian Goettsche, Gross Vollstedt (DE)

(73) Assignee: SENVION SE, Hamburg (DE)

( * ) Notice: Subject to any disclaimer, the term of this patent is extended or adjusted under 35 U.S.C. 154(b) by 499 days.

(21) Appl. No.: 14/344,839

(22) PCT Filed: Sep. 14, 2012

(86) PCT No.: PCT/EP2012/068079
§ 371 (c)(1),
(2), (4) Date: Mar. 13, 2014

(87) PCT Pub. No.: WO2013/045290
PCT Pub. Date: Apr. 4, 2013

(65) Prior Publication Data
US 2014/0321983 A1    Oct. 30, 2014

(30) Foreign Application Priority Data

Sep. 26, 2011 (DE) ........................ 10 2011 114 247

(51) Int. Cl.
*F03D 11/02*    (2006.01)
*F03D 1/00*    (2006.01)

(52) U.S. Cl.
CPC .............. *F03D 11/02* (2013.01); *F03D 1/003* (2013.01); *F03D 15/00* (2016.05); *F03D 80/00* (2016.05); *Y02E 10/722* (2013.01)

(58) Field of Classification Search
CPC .......... F03D 11/02; F03D 1/003; F03D 80/00; F03D 15/00
(Continued)

(56) References Cited

U.S. PATENT DOCUMENTS 7,891,949 B2 * 2/2011 Baker .................. F03D 1/0675
244/123.4
2009/0278359 A1 11/2009 Trede
(Continued)

FOREIGN PATENT DOCUMENTS

DE    10 2008 044 900    3/2010
EP    1 167 754    1/2002
EP    2 116 722    11/2009

OTHER PUBLICATIONS

International Search Report and Written Opinion mailed Dec. 13, 2012, directed to International Application No. PCT/EP2012/068079; 11 pages.

*Primary Examiner* — Kevin Lee
(74) *Attorney, Agent, or Firm* — Morrison & Foerster LLP

(57) ABSTRACT

The invention relates to a mobile rotary drive for a wind rotor of a wind power plant having a frame comprising a drive wheel for driving a segment of a rotor shaft of the wind power plant and a drive set which drives the drive wheel in rotation as a drive pinion, wherein the drive wheel is a friction wheel and interacts with a pressing device in such a way that the pressing device generates a force which presses the friction wheel onto the segment with the result that the friction wheel can apply a drive torque to the segment through friction, wherein a torque support for supporting an opposing torque to the drive torque generated by the friction wheel is also provided. Thanks to the friction wheel drive, there is no need for specific pre-equipping of the wind power plant. The invention makes available a mobile rotary drive which can be transported from one wind power plant to another.

15 Claims, 4 Drawing Sheets

(58) Field of Classification Search
USPC .................................................... 416/170 R
See application file for complete search history.

(56) References Cited

U.S. PATENT DOCUMENTS

2011/0185832 A1   8/2011  Dammer et al.
2013/0343889 A1* 12/2013  Himmelmann
                          et al. ...................... F03D 15/00
                                                       416/170 R

* cited by examiner

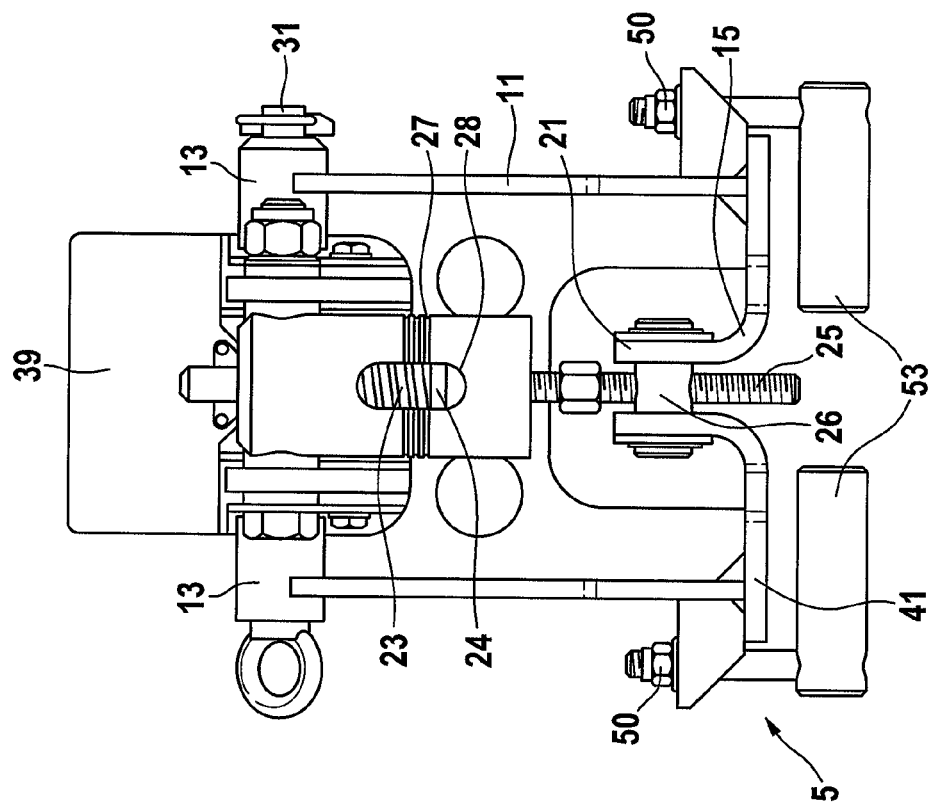
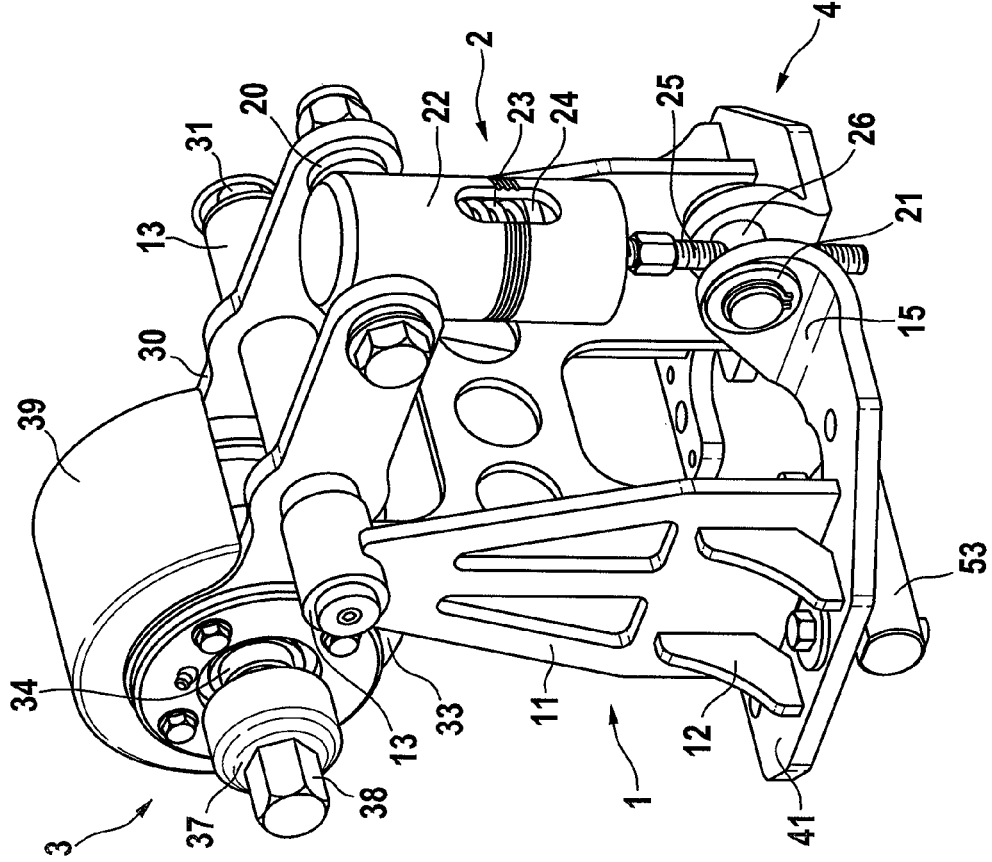
Fig. 2
Fig. 1

MOBILE ROTARY DRIVE FOR A ROTOR OF A WIND POWER PLANT

REFERENCE TO RELATED APPLICATIONS

This application is a national stage application under 35 USC 371 of International Application No. PCT/EP2012/068079, filed Sep. 14, 2012, which claims priority to German application no. 10 2011 114 247.2, filed Sep. 26, 2011, the entire contents of which are incorporated herein by reference.

FIELD OF THE INVENTION

The invention relates to a mobile rotary drive for a wind rotor of a wind power plant having a frame a drive wheel for driving a segment of a rotor shaft of the wind power plant and a drive set, which drives the drive wheel in rotation as a drive pinion.

BACKGROUND OF THE INVENTION

In erecting and maintaining wind power plants, some tasks require that the wind rotor should be rotated into certain prescribed positions. For example, access to the rotor hub through an access opening is only possible for a service technician if the rotor is in a particular position, so that the access opening is in overlap with a manhole on the end of the pod. In the course of some tasks, it is also necessary to turn the wind rotor several times, e.g. when changing the oil. During this process, the rotor blade has to be moved into a particular position to drain the oil from an actuating drive of said rotor blade, and this has to be repeated successively for all the rotor blades of the wind rotor. Various approaches have been disclosed in the prior art for facilitating this activity.

The first and oldest approach is to turn the wind power plant by hand, with a fitter gripping an element of the rotor shaft and in this way turning it. Whereas this can lead to quite reasonable results in the case of small wind power plants with a correspondingly small wind rotor, this is too laborious and time-consuming for larger modern wind power plants. Irrespective of this, it represents a considerable risk to the fitter because of the direct contact with the rotor shaft.

Relatively large wind power plants are often provided with a transmission for stepping up the rotational speed of the wind rotor, which tends to be somewhat low for aerodynamic reasons, to drive the generator. An additional flange, on which an adjusting motor is arranged, can be provided on this transmission. The gearset in the transmission is acted upon by actuating the adjusting motor, and the rotor shaft is thus turned slowly. This arrangement has the disadvantage that the transmission is subjected to an additional load. Not infrequently, this necessitates reinforcements. Moreover, there are certain concerns relating to the reliability of the transmission since the transmission is subjected to a load counter to the main load flow direction thereof owing to the influence of the adjusting motor.

The problems associated with the transmission are avoided in another approach, in which the gearset for the actuating drive is relocated out of the transmission. For this purpose, a separate gearwheel, in which the adjusting drive engages, is provided on the rotor shaft. In order to limit requirements in terms of costs and installation space to which an additional gearwheel of this kind gives rise, there is a known practice of designing the gearwheel as a specially designed brake disk with correspondingly shaped external teeth. However, one disadvantage of this solution is that the brake disk per se is a low-cost mass produced product and is converted into an expensive special component by the external teeth required. Moreover, it is possible to retrofit existing wind power plants only with difficulty.

SUMMARY OF THE INVENTION

It is an object of the invention, starting from the last-mentioned prior art, to provide an adjusting drive which is less complex and can also be used with wind power plants that have not been specially prepared.

A solution according to the invention lies in the features as broadly described herein and particularly those of the detailed embodiments described below.

In the case of a mobile rotary drive for a wind rotor of a wind power plant having a frame, a drive wheel for driving a segment of a rotor shaft of the wind power plant and a drive set, which drives the drive wheel in rotation as a drive pinion, provision is made according to the invention for the drive wheel to be a friction wheel and to interact with a contact pressure device in such a way that the contact pressure device produces a force which presses the friction wheel onto the segment in such a way that the friction wheel can apply a drive torque to the segment through friction.

An aspect of the invention is the idea of providing a mobile rotary drive which can be transported from one wind power plant to another and interacts with said plant only via a friction wheel drive on the rotor shaft, the wind power plant itself being conventional. By virtue of the friction wheel drive, special preparation of the wind power plant, in particular the provision of an expensive special component with exposed external teeth, is not necessary. The mobile rotary drive according to the invention is therefore universal in application, even in the case of wind power plants that have not been specially prepared.

By virtue of the integrated contact pressure device, reliable actuation is furthermore ensured by the nonpositive engagement brought about by the contact pressure device. The physical strength of the operator is therefore not critical. Moreover, dispensing with a gearwheel on the rotor shaft has the advantage that there is no need for exposed teeth, and therefore a reduction in the risk of injury is achieved. The invention thus combines the advantage of traditional manual actuation in respect of universal application and low outlay with the advantage of the mechanized solution in respect of ease of actuation.

The term "rotor shaft" is taken to mean that component of the drivetrain which transmits the mechanical power from the wind rotor to the generator. If the wind power plant has a transmission, both a region of the drivetrain which connects the wind rotor to the transmission and a region which connects the transmission to the generator are regarded as the rotor shaft. There is normally a parking brake on the output side of the transmission.

In this context, a segment of the rotor shaft is taken to mean the section of the rotor shaft on which the friction wheel acts. This can be a piece of the outer shell of the rotor shaft. However, it is preferably a region of the outer circumference of a component on the rotor shaft which has a larger diameter, e.g. a brake disk. This offers the advantage that it is normally present in any case as a parking brake and, on the other hand, makes lower demands on the level of driving power owing to the larger outer circumference and the resulting lever action.

In order to ensure ease of actuation, even in the case of very large wind power plants provided with heavy wind rotors, the drive set is preferably provided with a drive motor. However, this is not absolutely essential. Depending on the selected transmission ratio in the drive set, manual actuation by means of a wrench may be sufficient.

It is expedient if the drive set is provided with a connection for a separate drive means. Here, it is possible to use said wrench or, according to a particular version, a push-fit coupling is provided there. The push-fit coupling is expediently formed on an axle of the friction wheel. This allows a particularly space-saving and low-cost construction of the mobile rotary drive. A power tool, such as a commercially available cordless screwdriver, can be mounted on the push-fit coupling. This offers the advantage of little effort since the fitter will normally be carrying a cordless screwdriver in his toolkit in any case. It is thereby possible to combine the advantage of motor adjustment with the advantage of low weight of the mobile rotary drive since said drive does not require a dedicated drive motor. The connection of the drive set can additionally be provided with a safety clutch, which prevents spinning of the drive means and hence injury to the operator in the event of sudden gusts.

The contact pressure device is preferably designed in such a way that it has a load spring with an adjustable preloading device. A defined preload and hence contact pressure force of the friction wheel on the rotor shaft can thereby be set. In this case, different mounting positions that may arise in different wind power plants, owing to the respective design peculiarities thereof, can be taken into account. The preloading device that can be adjusted in this way advantageously has a number of preset load levels. All that is then required is to set the load level associated with the respective wind power plant. This makes preparation for work when using the mobile rotary drive considerably easier.

The load spring and the adjustable preloading device are preferably of compact construction with a diaphragm spring pack arranged in a cup. As a further particular feature, a spindle and an inspection window are provided, wherein the inspection window has markings which align with the diaphragm spring pack when the preload that is to be set is reached. The compact construction is not only advantageous in respect of the requirements thereof but, when required, also allows simple exchange. This furthermore offers the advantage that the markings on the inspection window allow easy and reliable setting across the load levels provided for the various wind power plants.

One proven practice is to arrange the friction wheel on a rocker, which is held pivotably on the frame. The rocker allows an advantageous arrangement of the friction wheel and of the contact pressure device in such a way, on the one hand, that reliable transmission of the contact pressure force produced by the contact pressure device is ensured and, on the other hand, that the friction wheel can also follow any irregularities in the roundness of the rotor shaft segment on which the friction wheel acts.

The friction wheel preferably has a track guiding groove. This is taken to mean that the circumference of the friction wheel has arranged on it a depression which is designed to receive an outer rim of the segment on which the wheel acts. In particular, this is a groove designed with a width such that the rim of the brake disk can be accommodated therein.

The rocker preferably has a link for connection to the contact pressure device, wherein the lever arm for the contact pressure device is greater than that of the friction wheel on the rocker. This ensures a force multiplication, with the result that the friction wheel is pressed onto the segment of the rotor shaft with a larger force than is produced by the contact pressure device. This allows a smaller and more compact and, ultimately also, a weight saving embodiment of the contact pressure device. The latter especially is of particular advantage for a mobile rotary drive.

The mobile rotary drive expediently has a removable torque support. This is used to support a countertorque to the drive torque produced by the friction wheel. In this context, the term "removable" is taken to mean that there is no permanent (fixed) connection to the wind power plant. The removable torque support is preferably designed as a support plate. The support plate is used for placing on a fixed element of the wind power plant and thereby supporting the countertorque. However, provision can also be made for the removable torque support to be embodied as a quick-action connector to a fixed device of the wind power plant. By means of the quick-action connector, rapid and, at the same time, reliable mounting of the mobile rotary drive at the beginning of use and, in turn, correspondingly quick removal after use can be achieved. It has proven particularly useful to design the quick-action connector for connection to a brake caliper of a disk brake device of the wind power plant. Thus, in a particular embodiment, the quick-action connector can be provided with locking pins which are guided in corresponding receptacles on the brake caliper. The mobile rotary drive is thereby supported and, at the same time, is positioned in such a way in relation to the rotor shaft that the friction wheel acts on the outer surface of the brake disk in a manner favorable for power transmission.

However, it is not essential that the removable torque support should interact directly with an element of the wind power plant. It is also possible for it to be embodied as a handle, in which case torque support is provided by the fitter. By virtue of the friction wheel drive provided according to the invention, the retaining forces required in this case are so low that they can be supplied by one person. Moreover, the friction wheel drive offers protection from an excessive retaining force and excessive stress on the fitter since the friction wheel will slip before this occurs. There is therefore intrinsic safety.

The torque support is preferably designed in such a way that it acts as a positioning element. This ensures that the correct contact of the torque support with an element of the wind power plant also simultaneously guarantees correct alignment of the mobile rotary drive with the segment of the rotor shaft.

BRIEF DESCRIPTION OF THE DRAWINGS

The invention is explained in greater detail below with reference to the attached drawing, in which an advantageous illustrative embodiment is shown and in which:

FIG. 1 shows a perspective view of an illustrative embodiment;

FIG. 2 shows a rear view of the illustrative embodiment shown in FIG. 1;

DETAILED DESCRIPTION OF THE INVENTION

Figure 4:
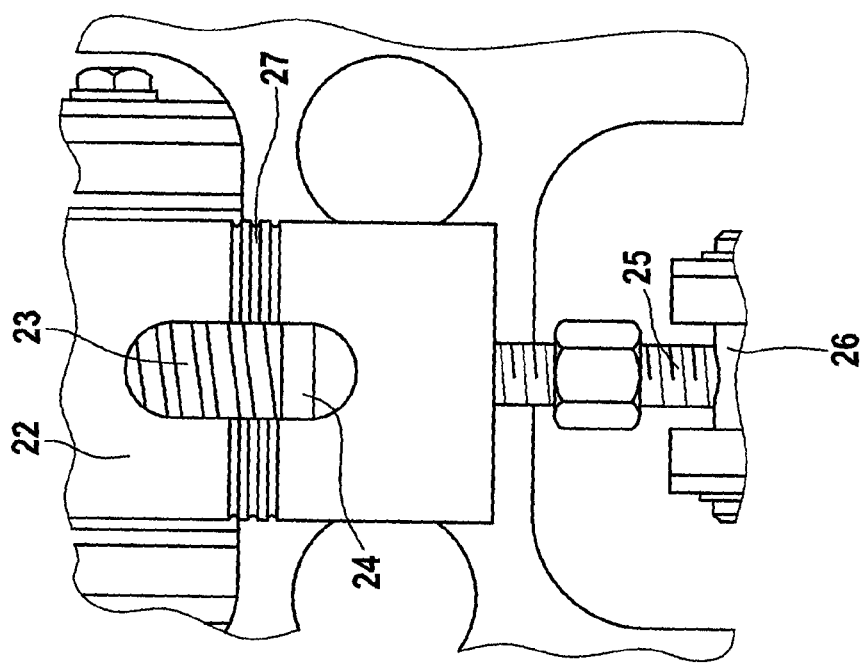
FIG. 4 shows a detail view of a contact pressure device.

A mobile rotary drive in accordance with the invention of compact construction is shown as an illustrative embodiment. As the main components, it comprises a frame 1, a contact pressure device 2, a drive set 3 and a torque support 4.

The frame 1 is erected as a plate structure and comprises a bearing pedestal 11 for a rocker 30 on the upper end thereof and a foot 12 for arrangement of the torque support 4 at the lower end thereof. The frame is manufactured from steel, preferably from the material S235 (formerly St 37-2).

The mobile rotary drive is provided for arrangement on a rotor shaft of a wind power plant. It is shown in part in dashed lines in FIG. 6. The rotor shaft transmits mechanical power from the wind rotor (not shown) of the wind power plant to a generator (not shown) with a transmission 98 arranged therebetween for stepping up the speed. In the present case, the area under consideration is that of the rotor shaft between the transmission 98 and the generator; this area is referred to below for short as rotor shaft 9. A brake disk 93 is arranged on the transmission end of the rotor shaft 9, rotating with said shaft and being surrounded by a brake caliper 94 secured in a fixed manner. By means of a hydraulic system (not shown), the brake caliper 94 is actuated, with the result that braking force is exerted on the brake disk 93 and the rotor shaft 9. This is known per se and therefore does not require any further explanation. In the illustrative embodiment, the rotary drive according to the invention is arranged with its foot 12 on the brake caliper 94.

The torque support 4 is arranged on the foot 12. It comprises a support plate 41 for support on an upper side of the brake caliper 94 of the rotor shaft 9 of a wind power plant. It interacts with pins 53, which are arranged in alignment with one another at opposite ends of the support plate 41. They are designed to engage positively in corresponding location openings in the brake caliper 94 and thus secure the torque support in its position, with the result that the support plate 41 always rests flush on the upper side of the brake caliper 94 during operation, even under high torque loading. In order to achieve this fixing and in order to achieve a desired relative position between the mobile rotary drive and the brake caliper 94, the foot 12 is provided with an alignment device 5. It comprises an adjusting screw 50, by means of which the spacing of the pins 53 can be modified. In the loosened state of the adjusting screw 50, the pins 53 can be pivoted, allowing the mobile rotary drive to be aligned, and, in the tightened state, they are securely clamped, and therefore the aligned position is fixed. The pins 53 and the adjusting screws 50 thus act as the alignment device 5. It should be noted that it is also possible for a handle to be provided for the torque support 4 instead of the support plate 41 and the pins 53.

The rocker 30 of the drive set 3 is mounted pivotably in sleeves 13 on the upper end of the bearing pedestal by means of a journal 31. A friction wheel 33 is rotatably mounted on the front end of the rocker 30 by means of an axle 34. On its outer circumference 35, which forms a running surface, the friction wheel 33 has a track groove 36, the width of which is matched to the thickness of the brake disk in such a way that the rim of said disk can be accommodated with clearance. A width of the track groove 36 of 34 mm in the case of a brake disk thickness of 30 mm is typical. The track groove 36 improves guidance during the operation of the mobile rotary drive. A push-fit coupling 37 is arranged for conjoint rotation on one end of the axle 34, being provided on its outward-pointing end with a hexagon 38. It acts as a push-fit coupling for coupling an adjusting tool, e.g. an adjusting wrench 95 (see FIG. 5) or a cordless screwdriver 97 (see FIG. 6).

The rear end of the rocker 30 is designed as a link with an upper pivotal attachment point 20 for the contact pressure device 2, the lower pivotal attachment point 21 of which is secured on a cantilever arm 15 of the frame 1. The contact pressure device 2 has a downwardly open spring cup 22, into which a compression spring 23 with a pressure plate 24 on its lower end is inserted. Mounted in the pressure plate is a spindle 25, which is passed through a countersleeve 26 at the lower pivotal attachment point 21. By turning the spindle 25, the preload of the compression spring 23, with which it pushes the upper pivotal attachment point 20 upward and hence the friction wheel 33 arranged on the other end of the rocker 30 downward onto the rim of the brake disk 93, can be adjusted.

A plurality of markings (three in the illustrative embodiment shown) are provided on the spring cup 22 for adaptation of the preload to the requirements of various wind power plants. For adjustment, the spindle 25 is turned until the upper edge of the pressure plate 24, which is visible in a window 28, is in alignment with the desired marking. The markings are embodied as encircling grooves 27.

A cover 39 for the friction wheel 33 is arranged on the front end of the rocker 30. The rotating parts are thereby protected from unintentional contact, and the risk of injury is correspondingly reduced.

Figure 3:
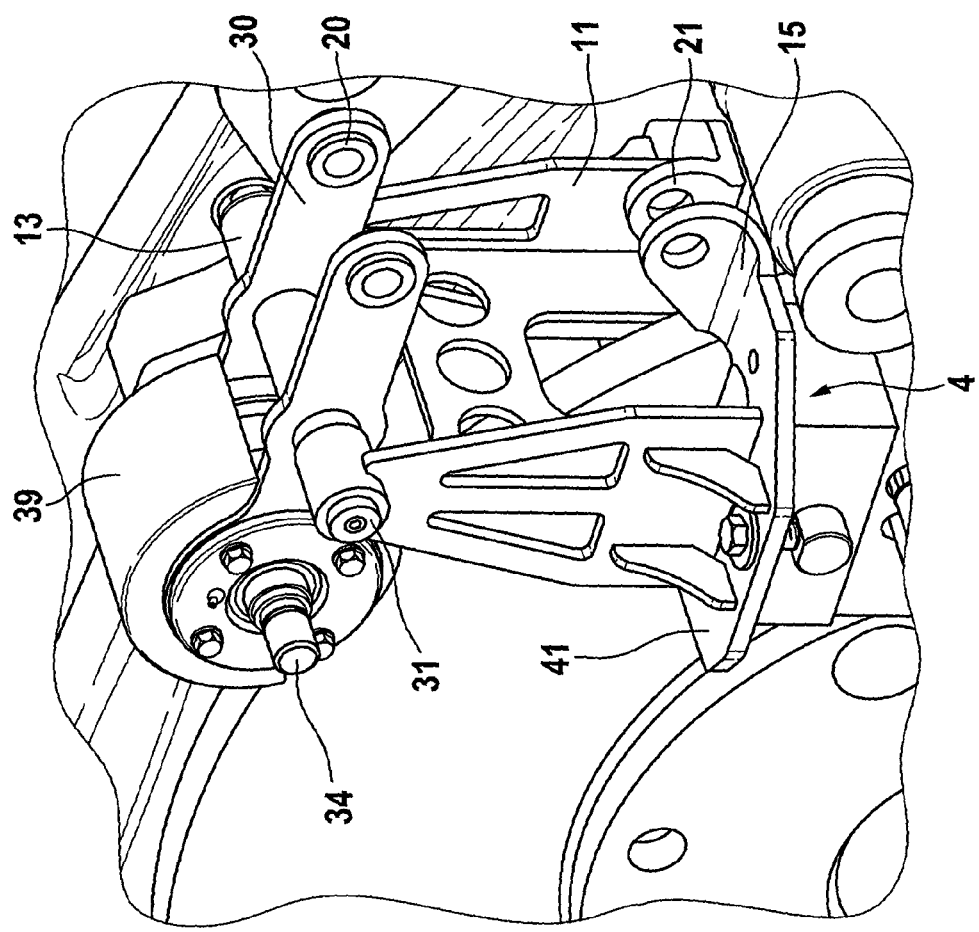
FIG. 3 shows a view in the partially assembled state.

The contact pressure device 2 with the upper and lower pivotal attachment points 20, 21 is preferably embodied as an interchangeable module (see FIG. 3). This enables a different contact pressure device to be employed when required in order to adapt the mobile rotary drive to other wind power plants with a different geometry, in particular spacing between the brake caliper and the rim of the brake disk, and also to different required contact pressure forces which go beyond the adjustment range possible by means of the spindle 25.

Figure 5:
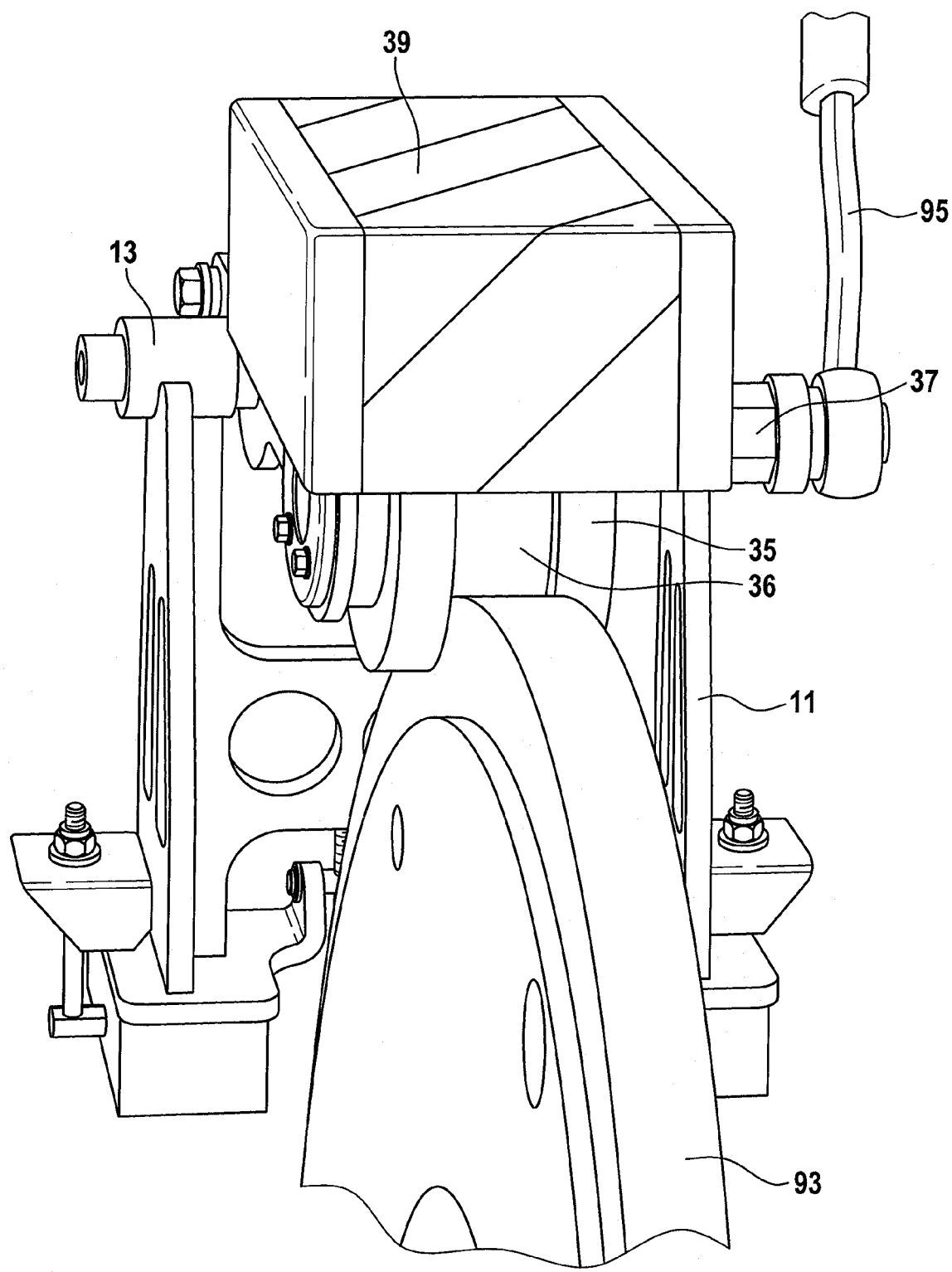
FIG. 5 shows a detail from the front.

The arrangement of the mobile rotary drive and its interaction with the brake disk 93 of the rotor shaft are illustrated in FIG. 5. Illustrated in the foreground is the brake disk 93, on the rim of which the friction wheel 33 runs with its track groove 36. The friction wheel 33 is protected from contact by the cover 39. An adjusting wrench 95 has been applied for manual rotation to the push-fit coupling 37 projecting to the right in the picture.

Figure 6:
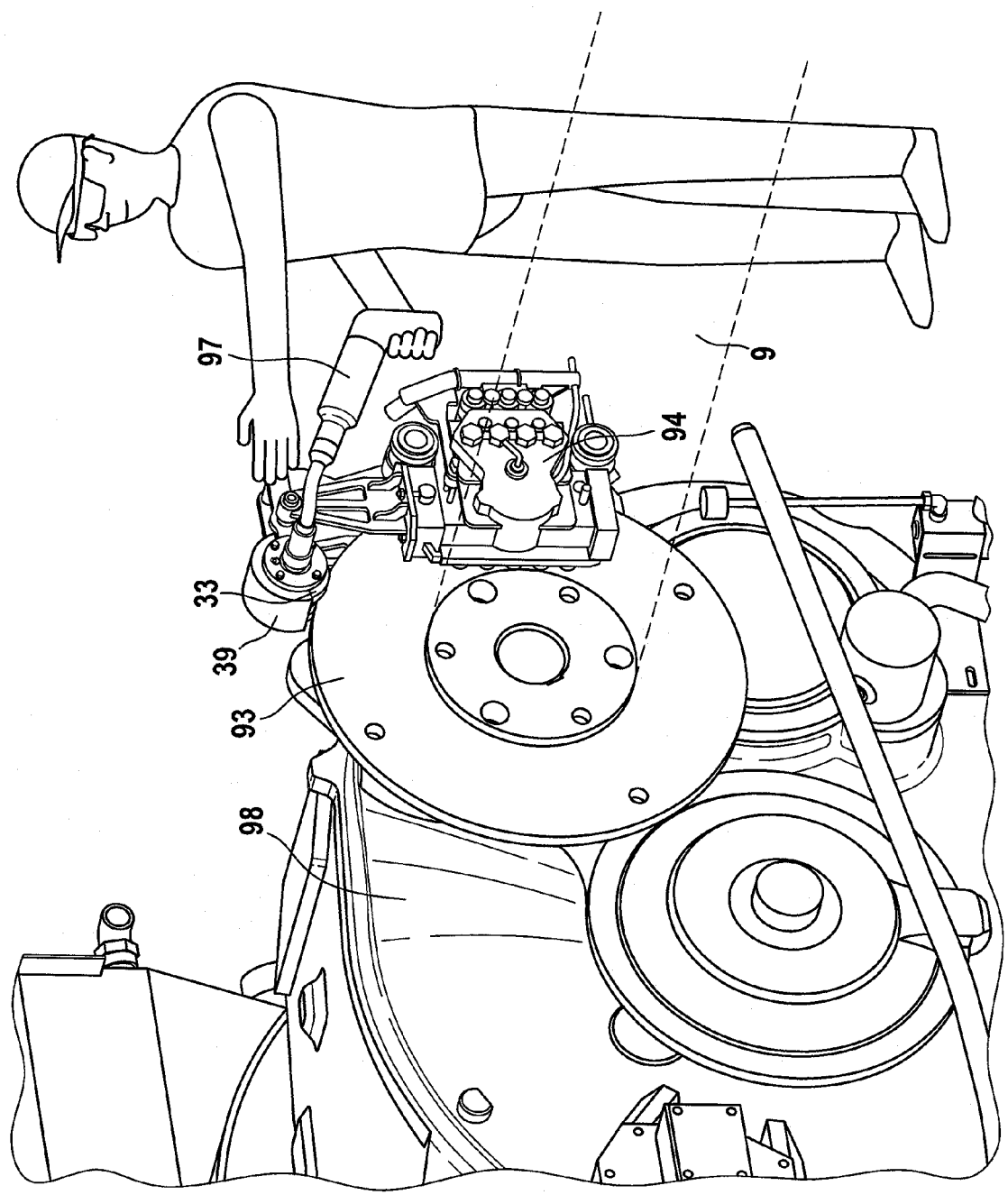
FIG. 6 shows an overall view in the assembled state on a rotor shaft of a wind power plant.

FIG. 6 shows a schematic depiction which illustrates the arrangement of the mobile rotary drive on the brake caliper 94. As a departure from FIG. 5, a cordless screwdriver 97 (with an optional bevel gear for more ergonomic holding) is now mounted as a drive on the push-fit coupling. It is clearly apparent that the mobile rotary drive can easily be installed and transported by one person by virtue of its compact construction and low weight (no dedicated drive motor is required).

The invention claimed is:
1. A mobile rotary drive for a wind rotor of a wind power plant comprising a frame, a drive wheel that drives a segment of a rotor shaft of the wind power plant, a drive set that drives the drive wheel in rotation as a drive pinion and a torque support,
   wherein the drive wheel comprises a friction wheel and that interacts with a contact pressure device such that the contact pressure device produces a force pressing the friction wheel onto the segment resulting in the friction wheel applying a drive torque to the segment through friction,
   wherein the torque support supports a countertorque to the drive torque produced by the friction wheel.

2. The mobile rotary drive of claim 1, wherein the drive set comprises a drive motor.

3. The mobile rotary drive of claim 1, wherein the drive set has a connection for a separate drive mechanism.

4. The mobile rotary drive as claimed in claim 3, wherein the connection comprises a push-fit coupling for the separate drive mechanism.

5. The mobile rotary drive of claim 4, wherein the separate drive mechanism comprises a wrench or a power tool.

6. The mobile rotary drive of claim 1, wherein the contact pressure device has a load spring with an adjustable preloading device.

7. The mobile rotary drive of claim 6, wherein the adjustable preloading device has a plurality of preset load levels for various wind power plants.

8. The mobile rotary drive of claim 1, wherein the friction wheel is arranged on a rocker which is held pivotably on the frame.

9. The mobile rotary drive of claim 8, wherein the rocker has a link for connection to the contact pressure device and a lever arm of the link is greater than a lever arm of the friction wheel on the rocker.

10. The mobile rotary drive of claim 1, wherein the torque support comprises a support plate.

11. The mobile rotary drive of claim 1, wherein the torque support comprises a quick-action connector to a fixed device of the wind power plant.

12. The mobile rotary drive of claim 11, wherein the quick-action connector comprises a pair of locking pins.

13. The mobile rotary drive of claim 1, wherein the torque support comprises a handle.

14. The mobile rotary drive of claim 5, wherein the separate drive mechanism comprises a cordless screwdriver.

15. The mobile rotary drive of claim 11, wherein the fixed device comprises a brake caliper.

* * * * *